(12) United States Patent
Nesyn et al.

(10) Patent No.: US 9,074,024 B2
(45) Date of Patent: Jul. 7, 2015

(54) METHOD FOR PRODUCING A SUSPENSION-TYPE DRAG REDUCING ADDITIVE FOR HYDROCARBON LIQUIDS

(71) Applicants: OIL TRANSPORTING JOINT STOCK COMPANY "TRANSNEFT", Moscow (RU); RESEARCH INSTITUTE FOR OIL AND OIL PRODUCTS TRANSPORTATION (NII TNN), LLC, Moscow (RU)

(72) Inventors: Georgy Viktorovich Nesyn, Moscow (RU); Andrey Mikhailovich Shiryaev, Moscow (RU); Marat Iozefovich Valiev, Moscow (RU); Aleksandr Nikolaevich Chentsov, Moscow (RU); Vladimir Ivanovich Fedota, Moscow (RU); Yuriy Viktorovich Lisin, Moscow (RU)

(73) Assignees: OIL TRANSPORTING JOINT STOCK COMPANY "TRANSNEFT", Moscow (RU); LIMITED LIABILITY COMPANY <<TRANSNEFT RESEARCH AND DEVELOPMENT INSTITUTE FOR OIL AND OIL PRODUCTS TRANSPORTATION>>, Moscow (RU)

( * ) Notice: Subject to any disclaimer, the term of this patent is extended or adjusted under 35 U.S.C. 154(b) by 0 days.

(21) Appl. No.: 14/348,609

(22) PCT Filed: Sep. 28, 2012

(86) PCT No.: PCT/RU2012/000790
§ 371 (c)(1),
(2) Date: Mar. 30, 2014

(87) PCT Pub. No.: WO2013/048289
PCT Pub. Date: Apr. 4, 2013

(65) Prior Publication Data
US 2014/0228529 A1    Aug. 14, 2014

(30) Foreign Application Priority Data

Sep. 30, 2011 (RU) .................. 2011139652

(51) Int. Cl.
| | | |
|---|---|---|
| *C08L 23/04* | (2006.01) | |
| *C08L 23/08* | (2006.01) | |
| *C08F 4/52* | (2006.01) | |
| *C08F 6/12* | (2006.01) | |
| *C10L 1/16* | (2006.01) | |
| *C10L 10/00* | (2006.01) | |
| *C08F 4/16* | (2006.01) | |
| *C10L 1/14* | (2006.01) | |
| *B05D 5/08* | (2006.01) | |

(52) U.S. Cl.
CPC ... *C08F 4/52* (2013.01); *B05D 5/08* (2013.01); *C08F 6/12* (2013.01); *C10L 1/1641* (2013.01); *C10L 10/00* (2013.01); *C08F 4/16* (2013.01); *C10L 1/143* (2013.01); *C10L 2230/14* (2013.01)

(58) Field of Classification Search
CPC ......................................................... B05D 5/08
USPC ................................. 523/175; 526/348, 348.5
See application file for complete search history.

(56) References Cited

U.S. PATENT DOCUMENTS

| | | | |
|---|---|---|---|
| 4,340,076 A | | 7/1982 | Weitzen |
| 4,433,123 A | * | 2/1984 | Mack .............. 526/139 |
| 4,693,321 A | | 9/1987 | Royer |
| 4,720,397 A | | 1/1988 | O'Mara |
| 4,826,728 A | | 5/1989 | O'Mara |
| 4,845,178 A | * | 7/1989 | Hostetler et al. .............. 526/153 |
| 5,449,732 A | * | 9/1995 | Smith et al. ................ 526/348.3 |
| 5,733,953 A | | 3/1998 | Fairchild |
| 6,126,872 A | | 10/2000 | Kommareddi |
| 6,160,036 A | | 12/2000 | Kommareddi |
| 6,576,732 B1 | * | 6/2003 | Milligan et al. .............. 526/347 |
| 6,596,832 B2 | * | 7/2003 | Johnston et al. .............. 526/347 |
| 6,649,670 B1 | * | 11/2003 | Harris et al. ................... 523/175 |
| 6,894,088 B2 | * | 5/2005 | Motier et al. .................. 523/175 |
| 6,939,902 B2 | * | 9/2005 | Smith et al. .................... 523/175 |
| 6,946,500 B2 | * | 9/2005 | Harris et al. ................... 523/175 |
| 7,271,205 B2 | * | 9/2007 | Mathew et al. ................ 523/175 |
| 7,939,584 B2 | * | 5/2011 | Harris et al. ................... 523/175 |
| 2003/0013783 A1 | | 1/2003 | Kommareddi |
| 2003/0069330 A1 | | 4/2003 | Johnston |
| 2006/0281832 A1 | * | 12/2006 | Harris ........................... 523/175 |
| 2007/0021531 A1 | * | 1/2007 | Motier et al. .................. 523/175 |

* cited by examiner

*Primary Examiner* — Rip A Lee
(74) *Attorney, Agent, or Firm* — Andrew W. Chu; Craft Chu PLLC

(57) ABSTRACT

The invention produces suspensions of higher α-olefins without using cryogenic comminution as well as without using polymer precipitation by adding a non-solvent to a polymer solution. Fine polymer dispersions are produced by thermal re-precipitation of a polymer in a liquid being a non-solvent for that polymer at room temperature and being capable of dissolving the polymer at a higher temperature. The polymer component of a suspension is produced by co-polymerization of higher α-olefins in a monomer mass in the presence of a Ziegler-Natta catalyst.

3 Claims, No Drawings

METHOD FOR PRODUCING A SUSPENSION-TYPE DRAG REDUCING ADDITIVE FOR HYDROCARBON LIQUIDS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The proposed invention relates to the field of pipeline transportation of liquid hydrocarbons, in particular to methods for decreasing their hydrodynamic resistance or method of drag reduction.

2. Description of Related Art Including Information Disclosed Under 37 CFR 1.97 and 37 CFR 1.98.

Recently, polymeric anti-turbulent additives (ATAs) or polymeric drag reducing additives (DRAs) are used for increasing capacity of oil and products pipelines. They represent a polymer solution or a polymer suspension in a liquid medium. A polymer should be soluble in a transported liquid and have a high molecular weight. Another pre-requisite for the effect of drag reduction (Toms Effect) is the turbulent mode of a hydrocarbon liquid flowing in a pipeline.

The introduction of a DRA into a crude oil flow in an amount from 10 to 50 grams per one ton results in increasing the pipeline capacity for 15-25%. The higher a polymer molecular weight, the lower is its concentration that is required for achieving said value of drag reduction.

Ultra-high molecular (co)polymers of higher $\alpha$-olefins, which are synthesized on Ziegler-Natta catalysts, are most commonly used as a polymeric component of DRA. As to their price-quality relation, they have no match among other oil-soluble polymers. Monomers having from 6 to 16 carbon atoms are used.

Initially, DRAs were produced as a polymer solution in gasoline (kerosene). However, injection-related problems due to its high viscosity, especially in winter, caused the present use of suspension-type DRAs. A suspension is produced, as a rule, by comminuting a product of block-polymerization of higher $\alpha$-olefins, which is a rubber-like material, at a temperature below its glass-transition point, and thus-obtained polymer particles are mixed with a liquid medium that does not dissolve the polymer. The liquid medium is selected so that its density does not greatly differ from that of the polymer, in order to avoid irreversible suspension layering during storage. The polymer content of a suspension-type DRA may be up to 25% and even more, which exceeds the polymer content of a solution-type additive greatly. The DRA solid phase may comprise surfactants or other anti-agglomerator agents that prevent polymer particles from agglomerating as well as additives for inhibiting polymer oxidative destruction.

Polymerization in a solution medium has been replaced by block polymerization also from the point of a polymer molecular weight that is significantly higher at block polymerization; consequently, a polymer thus produced is of higher quality.

The conventional technology of a suspension agent for decreasing hydrodynamic resistance may be divided into three steps:
1. Block polymerization of a monomer (co-monomers)
2. Comminution of a rubber-like co-polymer
3. Production of a suspension stable against layering (sedimentation)

Many patents relating to methods of producing suspension-type DRAs describe cryogenic comminution of polymers (U.S. Pat. No. 4,826,728, U.S. Pat. No. 4,720,397, U.S. Pat. No. 4,340,076). Since polymers and co-polymers of higher $\alpha$-olefins are rubber-like materials with low glass-transition temperatures (for example, poly-1-octene has glass-transition temperature below $-70°$ C.), their mechanical comminution is carried out in the liquid nitrogen medium, i.e. below their glass-transition temperatures.

It is well known, however, that operations employing liquefied gases are associated with higher risks and require special expensive equipment as well as certain safety measures for personnel. Furthermore, liquid nitrogen itself is an expensive material. Therefore, recently many companies started to work on creating non-cryogenic technologies of comminuting polyalphaolefins (U.S. Pat. No. 6,946,500, U.S. Pat. No. 6,894,088, U.S. Pat. No. 7,271,205, US Patent Application No. 0276566, US Patent Application No. 0287568). Preliminary impregnation with moistening agents is used for which purpose heavy alcohols, solid and liquid separating agents (derivatives of stearic acid, higher linear alcohols) as well as special equipment (homogenizers, abrasive mills, rotor-stator type grinders) are applied.

Here, it should be noted that a suspension-type additive must comprise a finely comminuted polymer, or the process of dissolving the polymer in an oil pipeline will be too long, which affects the resulting efficiency of a DRA. On the other hand, mechanical comminution of polymers, especially fine comminution to particles having a size of 100-300 microns, leads to partial mechanical destruction of macro molecules and poorer quality of the polymer.

Mechanical destruction can be avoided by, for example, capsulated polymerization of higher $\alpha$-olefins (U.S. Pat. No. 6,126,872, U.S. Pat. No. 6,160,036, U.S. Pat. No. 4,693,321, US Patent Application No. 20030013783). It consists in that catalyst-comprising monomer droplets are enclosed in a polymeric coating and suspended in a medium that does not dissolve any capsulated component. Micro-block polymerization is carried out in this way, and a dispersed polymer is produced in one step in the synthesis process. A significant disadvantage is low productivity of this process.

An alternative method for producing fine dispersions, which does not affect the length of a polymer molecule, consists in precipitating a polymer from a solution by adding a precipitating agent (U.S. Pat. No. 5,733,953). This method is the closest one to the present invention and is taken as a prototype.

Said method consists in that a polymer is precipitated, which has a high molecular weight and is synthesized by co-polymerization of higher $\alpha$-olefins with a Ziegler-Natta catalyst in a solvent medium.

The sequence of producing such a suspension is as follows (a citation): "a low-viscosity highly concentrated polymer suspension is produced by slowly adding a liquid not dissolving a polymer (e.g., isopropyl alcohol) to a polymer solution in a solvent (e.g., kerosene). When a non-solvent is added in a sufficient quantity, a polymer precipitates from the solution in the form of small particles. A liquid is separated from the precipitate, the latter is once again washed with the non-solvent. The resulting concentrated suspension, when introduced into a flow of a hydrocarbon liquid, dissolves quickly and causes a decrease in hydrodynamic resistance."

The prototype disadvantages are:

Poor quality of the polymer component

Necessity of regenerating a big volume of solvents

Pollution of the environment.

SUMMARY OF THE INVENTION

The objective of the present invention is to improve quality of the polymer component, reduce the volume of solvents, decrease loads to the environment.

The technical solution of the proposed method is block polymerization of a monomer (monomers) and conversion of a polymer into suspension of drag reducing additive through thermal re-precipitation.

DETAILED DESCRIPTION OF THE DRAWINGS

According to the present invention, the product of co-polymerization of higher $\alpha$-olefins in the mass of a monomer or monomers (bulk polymerization) in the presence of a Ziegler-Natta catalyst, preferably titanium trichloride in combination with diethylaluminum chloride, is used as the polymer component of the DRA.

In order to produce a finely dispersed suspension, the present invention proposes to use thermal re-precipitation of co-polymers of higher $\alpha$-olefins in a liquid that forms, together with a polymer, a system with the upper critical mixing temperature above +40° C.

Such a liquid is a non-solvent for the co-polymer at a temperature close to room temperature and becomes a solvent at a temperature above the critical mixing temperature. The latter may be, for example, +60° C. Then the environment temperature will not exceed this value even when the additive is used in southern regions. Otherwise, the suspension will turn into a rubber-like material that is practically unsuitable for introduction into a pipeline by any devices.

The non-solvent molecule should contain even one heteroatom (oxygen, nitrogen, sulfur, phosphor, fluorine), since polymers of higher $\alpha$-olefins form true solvents with all liquid hydrocarbons, both aliphatic and aromatic.

The dissolving capacity of a liquid medium may be varied by using some or other solvents, and, hence, decrease or increase a temperature of complete mixing, if necessary.

The working sequence for production of a suspension additive, including the step of thermal re-precipitation, is as follows:

1. Homo- or co-polymerization of higher $\alpha$-olefins (C6-C16) in the monomer mass under the treatment of a Ziegler-Natta catalyst up to high conversion of the monomer (monomers). When co-polymerizing higher olefins as co-monomers, it is allowed to use some quantity of lower olefins C2-C5. Preferably, a catalytic system consists of titanium trichloride and diethylaluminum chloride.

2. Preliminary comminution of the block polymerization product into particles having sizes more than 1 mm at room temperature. According to data available to us, such comminution does not lead to significant mechanical destruction and does not negatively affect the polymer quality.

3. Mixing of the comminuted polymer at room temperature; a liquid being a non-solvent for the polymer at room temperature and being a solvent at a higher temperature; and, if necessary, an anti-agglomerator and an oxidative destruction inhibitor in a ratio corresponding to the final formulation of the additive.

4. Dissolution of the polymer in the liquid at a higher temperature.

5. Cooling the mixture down to room temperature, obtaining of a commercial form of the suspension additive.

Thus, a block polymerization product is used as a co-polymer of higher $\alpha$-olefins, and thermal re-precipitation in a liquid being a non-solvent for a polymer at room temperature and being capable of dissolving it at a higher temperature is used for producing a polymer suspension instead of precipitation from a solution by adding a non-solvent.

Thermal re-precipitation of a polymer has a number of advantages over precipitation of a polymer from a solution that is described in the prototype.

First, the present invention uses a block co-polymer of an $\alpha$-olefin ($\alpha$-olefins), which has a higher molecular weight than a product of co-polymerization of $\alpha$-olefin ($\alpha$-olefins) in a solvent medium.

Second, for thermal re-precipitation it is possible to select such ratio between a polymer and a solvent that it corresponds to the formulation of a finished additive, i.e., a polymer content may be brought up to 23% or more. This removes the necessity of regenerating excess quantities of solvents, as it is done in the case described in the prototype.

Third, polymer particles produced by thermal precipitation are equal in size that is about 250 microns, which ensures their quick dissolution in hydrocarbon liquids.

Fourth, all the steps from polymerization to re-precipitation are practically waste-free, which reduces the environment pollution greatly.

The essence of the proposed method is illustrated by the following Examples.

Example 1

400 milliliters of 1-hexene was loaded into a reaction vessel, and the latter was purged through by gaseous nitrogen for 20 minutes. Then, while stirring and maintaining a nitrogen cushion, 35 milliliters of a diethylaluminum chloride (DEAC) in kerosene with the concentration of 97 grams per 1000 milliliters and 0.16 grams of TiCl3 in the form of a suspension in heptane were added successively. The TiCl3 suspension in heptane contained some quantity of diisoamyl ether as a polymerization accelerant. After stirring for 20-30 minutes, when the reaction mixture obtained some viscosity, which evidenced the initiation of polymerization, it was unloaded into a plastic container that was firmly sealed. Further polymerization was carried out without stirring at the ambient temperature that was maintained in the range from 0 to +5° C. in the beginning and then was brought to room temperature. After the monomer was converted by 90%, the produced rubber-like material was unloaded from the container and comminuted into particles having sizes from 1 to 3 millimeters at room temperature.

Then, the following mixture was prepared at room temperature: polymer chips:stearic acid amid:1-hexanol:dipropyleneglycol monomethyl alcohol in the weight ratio 27.0:2.5:47.0:23.5. The mixture total weight was 100 grams. Then the mixture was heated to 60° C. and held at mild stirring in the atmosphere of gaseous nitrogen until the polymer dissolved completely. Then, the produced viscoelastic mass was cooled down to room temperature at mild stirring. The viscoelastic mass turned into a low-viscosity suspension.

The addition of the suspension to aviation kerosene in the amount of 0.00022% (2.2 ppm) resulted in decreasing its hydrodynamic resistance by 30% in the turbulent flow mode. The tests were carried out on a laboratory test bench.

Example 2

300 milliliters of 1-hexene and 700 milliliters of 1-decene were loaded in a flow of gaseous nitrogen into a glass reactor having the volume of 2 Liters. The monomer mixture was purged through with nitrogen for 20 minutes, then 60 milliliters of a DEAC solution in kerosene with the concentration of 120 grams/1000 milliliters were added. Then, 0.4 grams of TiCl3 were added. After stirring in the nitrogen atmosphere for 30 minutes, when the reaction mass obtained a concentration of a liquid jelly, it was unloaded from the reactor in a nitrogen flow and packed into 2 plastic containers having the volume of 0.5 Liters each. Further polymerization was carried out without stirring, at +10° C. in the beginning and then at room temperature. After achieving 85% (by weight) conversion of the monomers was achieved, the co-polymer was removed from the container.

A polymer sample in the amount of 100 grams was comminuted into particles having sizes from 1 to 3 millimeters at room temperature and was immediately mixed with a liquid consisting of 275 grams of butyl ether of 2-ethylhexane acid and 25 grams of propyleneglycol. 0.1 grams of Irganox 1010 as an inhibitor of polymer thermal-oxidative destruction and 4.5 grams of calcium distearate were added to the mixture. The mixture was heated to 80° C. and held at this temperature until complete mixing of the polymer and the liquid phase. Then, the mixture temperature was brought down to 20° C. by using efficient cooling and mild stirring. In the result, a polymer low-viscosity suspension was formed that had the particle average size of 250 microns.

It is to be noted that the residual monomer, which did not entered into block polymerization (it was mainly decene in this Example), was not lost during polymer comminution and re-precipitation, but became a component of the mixed non-solvent.

The addition of the suspension to car gasoline AI95 in the amount of 0.00026% (2.6 ppm) resulted in decreasing its hydrodynamic resistance by 30% in the turbulent flow mode. The tests were carried out on a laboratory test bench.

Use of the proposed method improves quality of a polymer component, reduces volumes of solvents, decreases the environment pollution. It is achieved due block polymerization of a monomer (monomers) and conversion of a polymer into a suspension-type drag reducing additive by a method of thermal re-precipitation.

We claim:

1. A method to produce a suspension of drag reducing additive for hydrocarbon liquids, the method comprising the steps of:
    synthesizing a bulk polymerization polymer product by co-polymerization of higher α-olefins with a number of carbon atoms from 6 to 16 under action of a Ziegler-Natta catalyst;
    producing a comminuted polymer of from more than 1 to 3 mm size particles soluble in hydrocarbon liquids from the polymer product;
    mixing said comminuted polymer with a liquid at room temperature so as to form a mixture, wherein said liquid is non-solvent for the comminuted polymer at room temperature and dissolves the comminuted polymer at a critical mixing temperature, said critical mixing temperature being higher than room temperature;
    heating the mixture of the comminuted polymer and the liquid to a temperature above the critical mixing temperature, the comminuted polymer dissolving in the liquid so as to form a heated mixture; and
    cooling the heated mixture of the comminuted polymer and the liquid down to room temperature so as to form the suspension of drag reducing additive.

2. The method to produce a suspension of drag reducing additive for hydrocarbon liquids, wherein the critical mixing temperature is above 40 degrees Celsius.

3. The method to produce a suspension of drag reducing additive for hydrocarbon liquids, wherein the critical mixing temperature is 60 degrees Celsius.

* * * * *